United States Patent [19]

Greskovich et al.

[11] Patent Number: 4,518,546
[45] Date of Patent: May 21, 1985

[54] PREPARATION OF YTTRIA-GADOLINIA CERAMIC SCINTILLATORS BY SINTERING AND GAS HOT ISOSTATIC PRESSING

[75] Inventors: Charles D. Greskovich; Dominic A. Cusano, both of Schenectady, N.Y.; Frank A. DiBianca, Chapel Hill, N.C.

[73] Assignee: General Electric Company, Schenectady, N.Y.

[21] Appl. No.: 608,323

[22] Filed: May 8, 1984

Related U.S. Application Data

[63] Continuation-in-part of Ser. No. 389,817, Jun. 18, 1982, abandoned.

[51] Int. Cl.$^3$ ............................................. C04B 35/50
[52] U.S. Cl. ........................................... 264/1.2; 264/65; 264/85; 264/325
[58] Field of Search ................. 252/301.4 R; 264/1.2, 264/65, 85, 325, 332

[56] References Cited

U.S. PATENT DOCUMENTS

| | | | |
|---|---|---|---|
| 3,562,371 | 2/1971 | Bush | 264/332 |
| 3,842,012 | 10/1974 | Hoppenbrouwers | 252/301.4 R |
| 4,007,251 | 2/1977 | Isaksson | 501/96 |
| 4,040,845 | 8/1977 | Richerson | 106/38.9 |
| 4,147,744 | 4/1979 | Rhodes | 264/65 |
| 4,224,524 | 9/1980 | Suys | 250/486 |
| 4,225,653 | 9/1980 | Brixner | 428/539 |
| 4,242,221 | 12/1980 | Cusano | 252/301.4 H |

FOREIGN PATENT DOCUMENTS

792071  3/1958  United Kingdom ... 07001968/GBX

OTHER PUBLICATIONS

Bucliono, "Callittoluminescent Property of the Rare Earth in Yttrium Oxide", *J. Applied Physics*, vol. 39, No. 9, Aug. 1968, pp. 4342-4347.
Rhodes, "Controlled Transient Solid Second Phase Sintery of Yttria", *J. Am. Cir. Soc.*, vol. 64, No. 1, Jan. 1981, pp. 13-19.
Cornell, "Transparent $Gd_2O_3$ Ceramics and Phorphors", *Mat. Res., Bull.*, vol, 7, pp. 647-654, 1972.
Greskowich, "Fabricatrion of Transparent $ThO_2$--Doped $Y_2O_3$", *Am. Cir. Soc. Bull.*, vol. 52, No. 3, pp. 473-478, (1973).

*Primary Examiner*—John A. Parrish
*Attorney, Agent, or Firm*—Robert J. Jarvis; James C. Davis, Jr.; Marvin Snyder

[57] ABSTRACT

Sintering and gas hot isostatic pressing are used to prepare polycrystalline yttria-gadolinia ceramic scintillator bodies. Multi-component powder compacts, formed by cold pressing cold isostatic pressing, are sintered to the closed porosity stage. The density of the sintered compacts is then increased by gas hot isostatic pressing. The finished scintillator includes $Y_2O_3$, $Gd_2O_3$, and one or more of $Eu_2O_3$, $Nd_2O_3$, $Yb_2O_3$, $Dy_2O_3$, $Pr_2O_3$, and $Tb_2O_3$ rare earth activator oxides. The finished scintillator may also include at least one of SrO and CaO as afterglow reducers.

22 Claims, 7 Drawing Figures

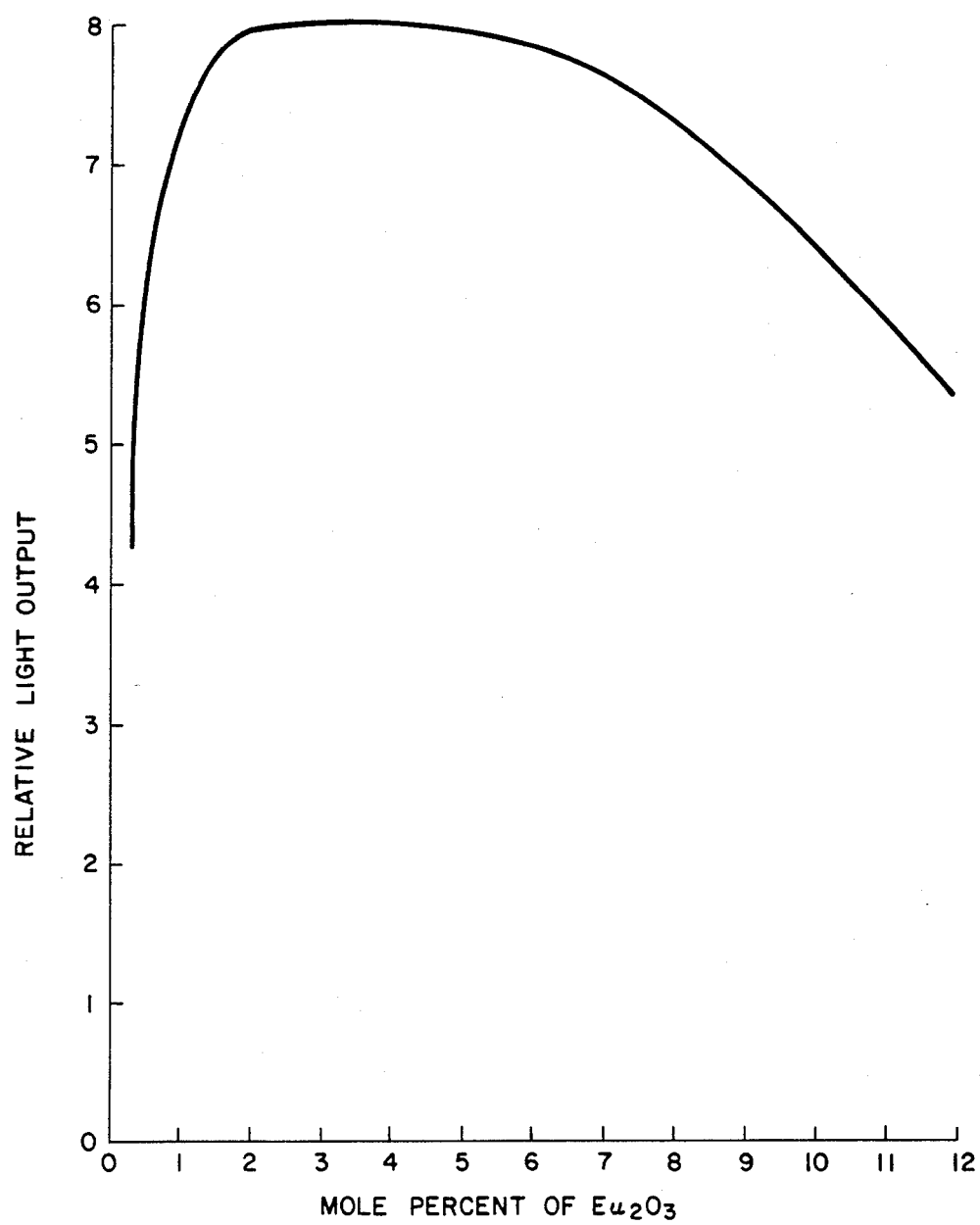

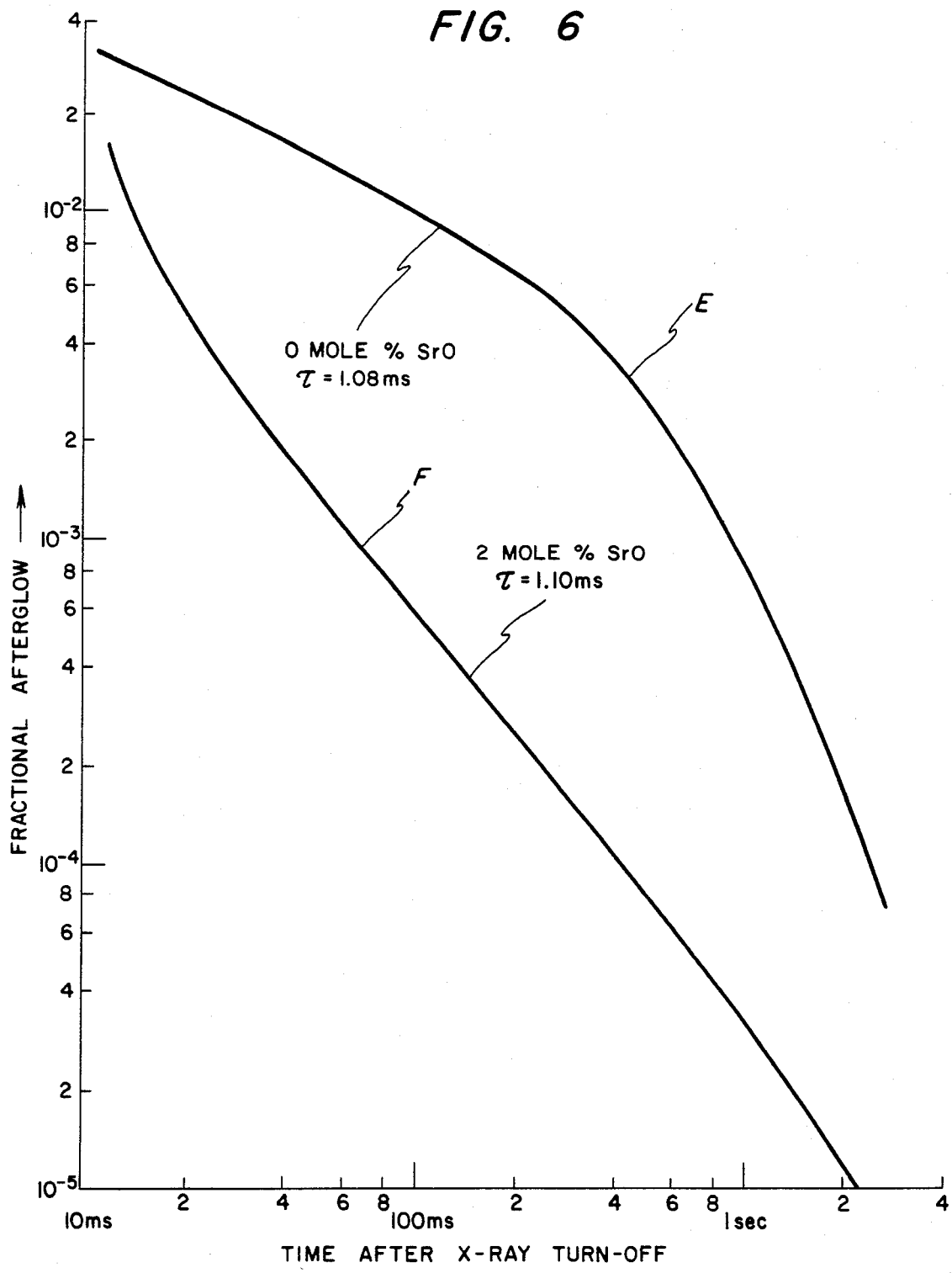

PREPARATION OF YTTRIA-GADOLINIA CERAMIC SCINTILLATORS BY SINTERING AND GAS HOT ISOSTATIC PRESSING

RELATED APPLICATIONS

This application is a continuation-in-part of application Ser. No. 389,817, filed June 18, 1982 and now abandoned. This application is related to application Ser. Nos. 389,812, 389,814, 389,828, and 389,829, all filed on the same date as prior application Ser. No. 389,817 and all assigned to the same assignee as the present invention. It is also related to application Ser. No. 389,815, which issued as U.S. Pat. No. 4,421,671 on Dec. 28, 1983, application Ser. No. 389,816, which issued as U.S. Pat. No. 4,466,929 on Aug. 21, 1984, application Ser. No. 389,818, which issued as U.S. Pat. No. 4,473,513 on Sept. 25, 1984, and application Ser. No. 389,830, which issued as U.S. Pat. No. 4,466,930 on Aug. 21, 1984.

BACKGROUND OF THE INVENTION

The present invention relates to rare-earth doped ceramic scintillators for computerized tomography (CT) and other X-ray, gamma radiation, and nuclear radiation detecting applications. More specifically, the invention relates to rare-earth-doped, polycrystalline, yttria/gadolinia ($Y_2O_3$/$Gd_2O_3$) ceramic scintillators.

Computerized tomography scanners are medical diagnostic instruments in which the subject is exposed to a relatively planar beam or beams of X-ray radiation, the intensity of which varies in direct relationship to the energy absorption along a plurality of subject body paths. By measuring the X-ray intensity (i.e., the X-ray absorption) along these paths from a plurality of different angles or views, an X-ray absorption coefficient can be computed for various areas in any plane of the body through which the radiation passes. These areas typically comprise approximately a square portion of about 1 mm × 1 mm. The absorption coefficients are used to produce a display of, for example, the bodily organs intersected by the X-ray beam.

An integral and important part of the scanner is the X-ray detector which receives the X-ray radiation which has been modulated by passage through the particular body under study. Generally, the X-ray detector contains a scintillator material which, when excited by the impinging X-ray radiation, emits optical wavelength radiation. In typical medical or industrial CT applications, the optical output from the scintillator material is made to impinge upon photoelectrically responsive materials in order to produce electrical output signals, the amplitude of which is directly related to the intensity of the impinging X-ray radiation. The electrical signals are digitized for processing by digital computer means which generates the absorption coefficients in a form suitable for display on a cathode ray tube screen or other permanent media.

Due to the specific and demanding computerized tomography requirements, not all scintillator materials which emit optical radiation upon excitation by X-ray or gamma ray radiation are suitable for CT applications. Useful scintillators must be efficient converters of X-ray radiation into optical radiation in those regions of the electromagnetic spectrum (visible and near visible) which are most efficiently detected by photosensors such as photomultipliers or photodiodes. It is also desirable that the scintillator transmit the optical radiation efficiently, avoiding optical trapping, such that optical radiation originating deep in the scintillator body escapes for detection by externally situated photodetectors. This is particularly important in medical diagnostic applications where it is desirable that X-ray dosage be as small as possible to minimize patient exposure, while maintaining adequate quantum detection efficiency and a high signal-to-noise ratio.

Among other desirable scintillator material properties are short afterglow or persistence, low hysteresis, high X-ray stopping power, and spectral linearity. Afterglow is the tendency of the scintillator to continue emitting optical radiation for a time after termination of X-ray excitation, resulting in blurring, with time, of the information-bearing signal. Short afterglow is also highly desirable in applications requiring rapid sequential scanning such as, for example, in imaging moving bodily organs. Hysteresis is the scintillator material property whereby the optical output varies for identical X-ray excitation based on the radiation history of the scintillator. This is undesirable due to the requirement in CT for repeated precise measurements of optical output from each scintillator cell and where the optical output must be substantially identical for identical X-ray radiation exposure impinging on the scintillator body. Typical detecting accuracies are on the order of one part in one thousand for a number of successive measurements taken at relatively high rate. High X-ray stopping power is desirable for efficient X-ray detection. X-rays not absorbed by the scintillator escape detection. Spectral linearity is another important scintillator material property because X-rays impinging thereon have different frequencies. Scintillator response must be substantially uniform at all X-ray frequencies.

Among scintillator phosphors considered for CT use are monocrystalline materials such as cesium iodide (CsI), bismuth germanate ($Bi_4Ge_3O_{12}$), cadmium tungstate ($CdWO_4$), and sodium iodide (NaI). Many of the aforementioned materials typically suffer from one or more deficiencies such as excessive afterglow, low light output, cleavage, low mechanical strength, hysteresis, and high cost. Many monocrystalline scintillators are also subject to hygroscopic attack. Known polycrystalline scintillators are efficient and economical. However, due to their polycrystalline nature, such materials are not efficient light propagators and are subject to considerable optical trapping. Internal light paths are extremely long and tortuous, resulting in unacceptable attenuation of optical output.

Fabrication of monocrystalline scintillators from multicomponent powder constituents is typically not economical and is frequently impractical. The multicomponent powder composition must be heated to a temperature above its melting point, and ingots of dimensions larger than those of each detector channel are grown from the melt. Considering the size of the bars required and the temperatures involved, the process is difficult in and of itself. In addition, some materials exhibit phase changes while cooling, which would cause the crystals to crack when cooled after the growing process. Furthermore, single crystals tend to be susceptible to the propogation of lattice defects along the crystal planes.

U.S. Pat. No. 4,242,221 issued to D. A. Cusano et al (assigned to the same assignee as the present invention) describes methods for fabricating polycrystalline phosphors into ceramic-like scintillator bodies for use in CT.

The present invention provides improved ceramic scintillators composed of yttria-gadolinia and including a variety of rare earth activators for enhancing luminescent efficiency.

The terms "transparency" and "translucency", as used herein, describe various degrees of optical clarity in the scintillator material. Typically, the inventive scintillator materials exhibit an optical attenuation coefficient of less than 100 cm$^{-1}$, as measured by standard spectral transmittance tests (i.e., "narrow" angle transmission) on a polished scintillator material plate, at the luminescent wavelength of the respective ion. The most desirable scintillator materials have lower attenuation coefficients and hence higher optical clarity (transparency).

SUMMARY OF THE INVENTION

The invention relates to a method for preparing a yttria-gadolinia polycrystalline ceramic scintillator body by sintering and gas hot isostatic pressing. The method includes preparing a multicomponent powder including $Y_2O_3$, $Gd_2O_3$, and at least one rare-earth activator oxide selected from the group consisting of $Eu_2O_3$, $Nd_2O_3$, $Yb_2O_3$, $Dy_2O_3$, $Tb_2O_3$, and $Pr_2O_3$. The multicomponent powder is pressed to form powder compacts which are sintered to the closed porosity stage. The sintered compacts are then gas hot isostatically pressed at elevated temperature to form the polycrystalline ceramic scintillator body.

The powder may also include at least one of SrO and CaO as afterglow reducers.

It is an object of the invention to provide a sintering and gas hot isostatic pressing process for preparing rare-earth-doped, transparent-to-translucent polycrystalline yttria-gadolinia ceramic scintillators having cubic crystalline structure, high X-ray stopping power, high density, high uniformity and, high radiant efficiency, and which are useful in radiation detectors such as those used in CT and digital radiography.

It is another object of the invention to provide a process for preparing polycrystalline yttria-gadolinia ceramic scintillators exhibiting low luminescence afterglow.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings.

FIG. 2 is a graphical illustration of the dependence of the relative light output on $Eu_2O_3$ activator concentration in an inventive scintillator material containing 25 mole percent $Gd_2O_3$.

FIG. 6 is a graphical illustration of the effect of increased SrO concentration on scintillator material afterglow.

DETAILED DESCRIPTION OF THE INVENTION

U.S. Pat. No. 3,640,887, issued to R. C. Anderson and assigned to the same assignee as the present invention, describes the manufacture of transparent polycrystalline ceramic bodies. The bodies include the oxides of thorium, zirconium and hafnium and mixtures thereof with oxides of rare earth elements 58 through 71 of the Periodic Table. The bodies may optionally include yttria. The average ionic radius of the rare earth oxide, with or without yttria, must not exceed about 0.93 Å, and the difference in ionic sizes of the constituent oxides should not exceed about 0.22 Å. The polycrystalline ceramics are used in high temperature applications and/or in applications requiring light transmission. Exemplary applications include high temperature microscopes, lamp envelopes, laser applications, and furnace windows.

The aforedescribed patent teaches that each polycrystalline ceramic body includes between about 2 to 15 mole percent of thoria ($ThO_2$), zirconia ($ZrO_2$), hafnia ($HfO_2$), or some combination thereof to act as a densifying agent during sintering.

Figure 1:
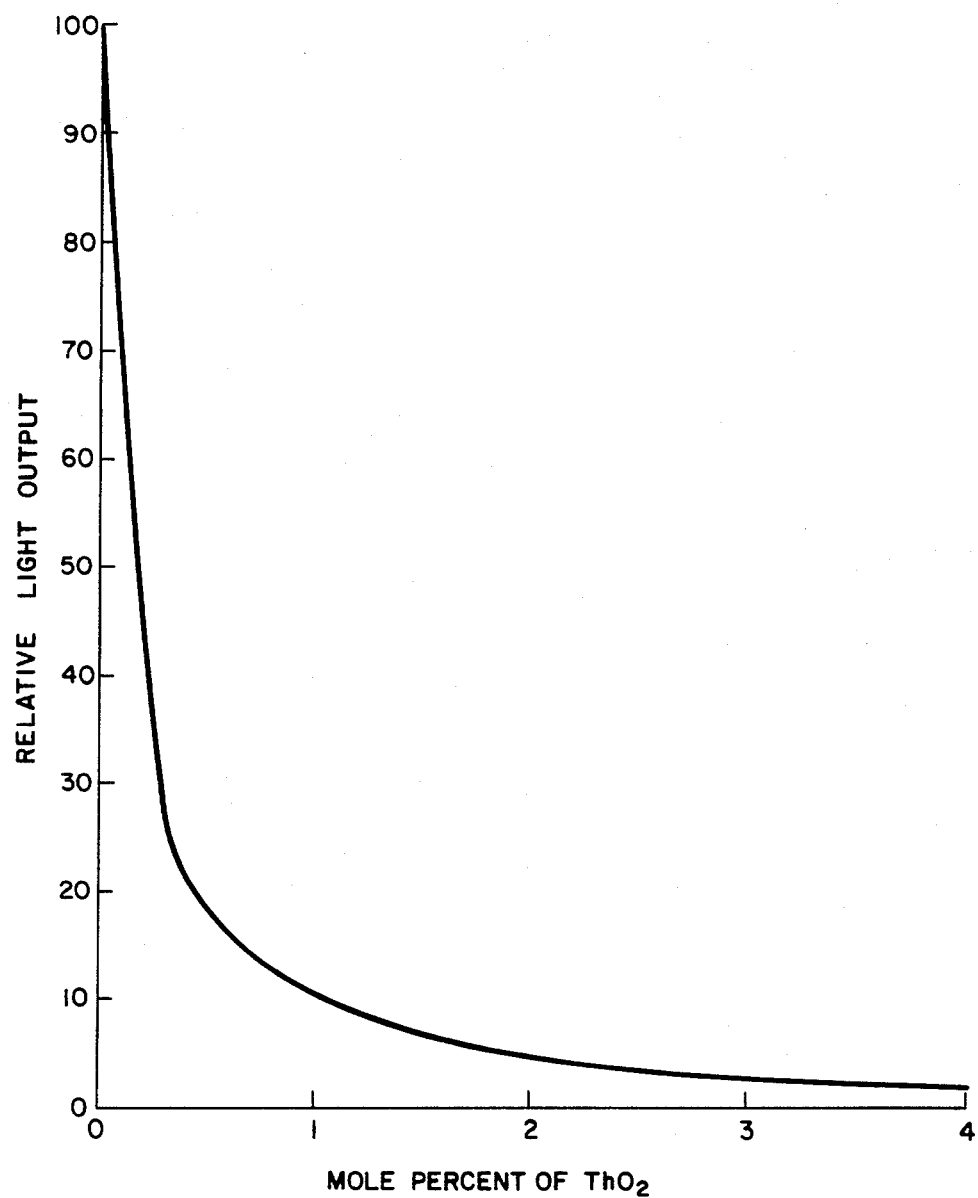
FIG. 1 is a graph depicting the effect of increased thoria ($ThO_2$) content on the light output of a yttria-gadolinia ceramic scintillator containing 3 mole percent $Eu_2O_3$.

The inventors herein have found, however, that the inclusion of $ThO_2$, $ZrO_2$, or $HfO_2$ in the scintillator materials of the present invention in the quantities specified in the aforementioned Anderson patent results in a material having greatly reduced light output when excited by high energy radiation such as X-rays, making such materials unsuitable for CT applications. FIG. 1 illustrates relative light output (vertical axis) of a polycrystalline ceramic composed of about 58.7 mole percent $Y_2O_3$, 38 mole percent gadolinia, 3 mole percent $Eu_2O_3$, and 0.3 mole percent $Yb_2O_3$, with increasing $ThO_2$ mole percent (shown on the horizontal axis). As the quantity of $ThO_2$ is increased, the quantity of $Y_2O_3$ is correspondingly decreased. The average ionic radius of the ceramic constituents and the difference between ionic radii are as specified in the Anderson patent. It is evident from FIG. 1 that the light output for a material containing 2 mole percent $ThO_2$ (the minimum amount specified by Anderson) is only 5 percent of the light output for the same material without thoria. In fact, the addition of as little as 0.5 mole percent $THO_2$, well below the lower limit specified in the Anderson patent, reduces the light output to a value of about 18 percent of that measured for the material without thoria. Ceramic scintillator materials useful in CT should have a light output no lower than about 35 percent of the light output of the material without $ThO_2$.

Substantial light output decreases have also been observed for additives such as cerium oxide ($CeO_2$), titanium oxide ($TiO_2$), zirconium oxide ($ZrO_2$) and, tantalum oxide ($Ta_2O_5$). For example, the relative light output of a ceramic body containing 55.5 mole percent $Y_2O_3$, 38 mole percent $Gd_2O_3$, 1 mole percent $Eu_2O_3$, 0.5 mole percent $Yb_2O_3$, and 2 mole percent $ZrO_2$ was found to be 4 percent of the light output of the same material without ZrO$_2$. These tetravalent (4+) and pentavalent (5+) additive species have an inhibiting effect on light output. It is important to note that light output refers to scintillation resulting from X-ray excitation. This is a significant distinction since some ceramic bodies fluoresce under ultraviolet excitation, but do not scintillate upon X-ray excitation, for example.

In accordance with the present invention, translucent-to-transparent rare-earth ceramic scintillator bodies are produced without the addition of the aforedescribed scintillation inhibiting densifying additives. The light output of the inventive ceramic scintillators upon X-ray excitation is sufficient to render them useful in CT.

The inventive scintillators are made up of rare earth yttria-gadolinia hosts and trivalent rare earth activator oxides. The scintillator bodies are fabricated by one of several methods, such as sintering, sintering with gas hot isostatic pressing (GHIP), and hot pressing (all more fully described hereinafter). The finished scintillator bodies having optimum over-all properties are comprised of a cubic solid solution of the chemical constituents as verified by X-ray diffraction techniques.

The oxides of trivalent rare earth elements such as europium, neodymium, ytterbium, dysprosium, terbium, and praseodymium (Eu$_2$O$_3$, Nd$_2$O$_3$, Yb$_2$O$_3$, Dy$_2$O$_3$, Tb$_2$O$_3$, and Pr$_2$O$_3$, respectively) are added to the basic yttria-gadolinia system as activators to enhance scintillator efficiency. Yttria-gadolinia scintillators containing Eu$_2$O$_3$ exhibit excellent scintillating efficiency. Generally, rare earth activator concentration may range between 0.02 and 12 mole percent. Optimum concentration of Eu$_2$O$_3$ is between 1 and 6 mole percent. This is illustrated in FIG. 2 which shows that the highest relative light output, indicated on the vertical axis, is observed for Eu$_2$O$_3$ concentrations of between about 1 and 6 mole percent, as indicated on the horizontal axis. The curve depicted in FIG. 2 was obtained by varying Eu$_2$O$_3$ content of a scintillator material containing 25 mole percent Gd$_2$O$_3$, the remainder being Y$_2$O$_3$.

An exemplary yttria-gadolinia scintillator material using neodymium oxide (Nd$_2$O$_3$) activator is made up of 30 mole percent Gd$_2$O$_3$, 0.25 mole percent Nd$_2$O$_3$, the remainder being Y$_2$O$_3$. Nd$_2$O$_3$ is preferably added in quantities of between 0.05 and 1.5 mole percent. Most preferably, however, Nd$_2$O$_3$ is added in concentrations of between 0.1 and 0.5 mole percent. Preferred terbium oxide (Tb$_2$O$_3$) activator concentration is between 0.05 and 3.0 mole percent, while the preferred concentration of dysprosium oxide (Dy$_2$O$_3$) activator is between 0.03 and 1.0 mole percent. Exemplary compositions of yttria-gadolinia scintillator materials employing Tb$_2$O$_3$ and Dy$_2$O$_3$ rare earth activators comprise 0.15 mole percent Tb$_2$O$_3$, and 0.2 mole percent Dy$_2$O$_3$, respectively, each including 40 mole percent Gd$_2$O$_3$, the remainder being Y$_2$O$_3$. The preferred range for Yb$_2$O$_3$ is between about 0.10 and 2.0 mole percent. The preferred mole percentage for the Pr$_2$O$_3$ activator is between 0.02 and 0.05.

It is to be noted that activator efficacy is independent of the compositional ratios of Y$_2$O$_3$ and Gd$_2$O$_3$. Eu$_2$O$_3$ is the preferred activator followed, in order of preference, by Nd$_2$O$_3$ and Dy$_2$O$_3$.

Figure 3A:
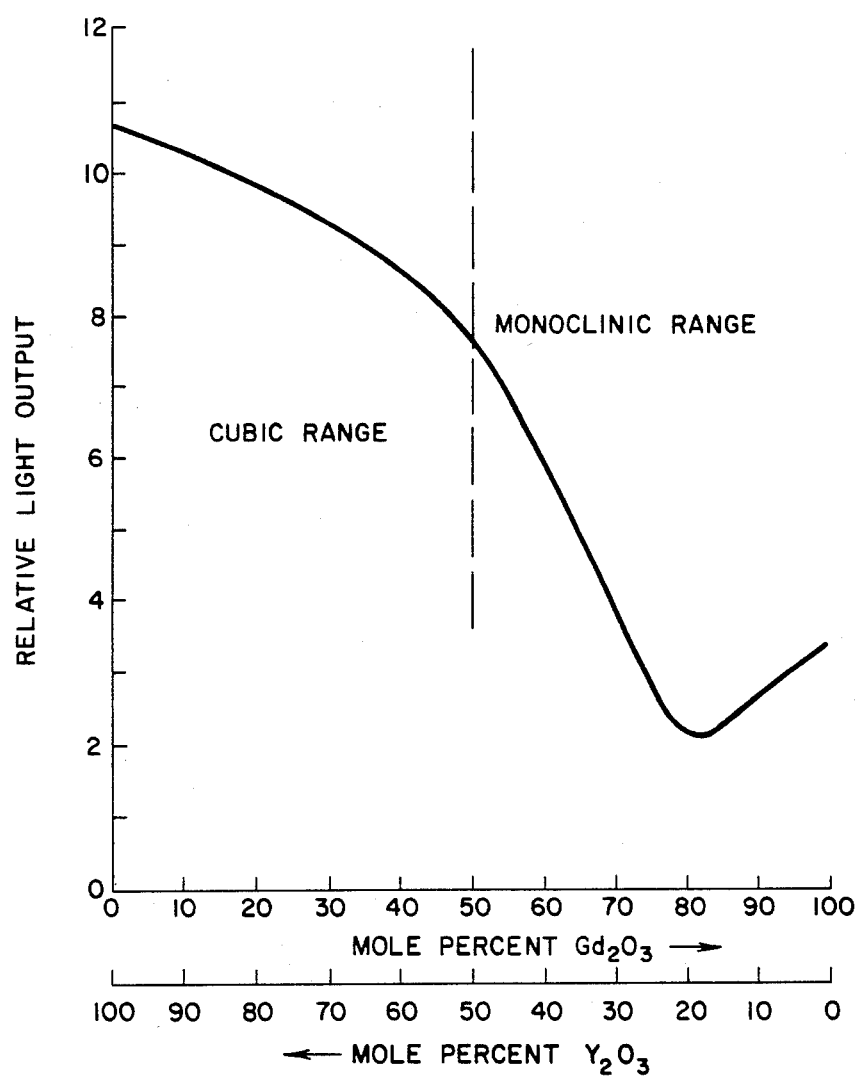
FIG. 3a illustrates graphically the dependence of scintillator efficiency on yttria-gadolinia compositional ratio of an inventive ceramic scintillator containing 3 mole percent $Eu_2O_3$.

FIG. 3a illustrates the dependence of scintillator efficiency, as measured by relative light output, on the relative mole percent contents of yttria and gadolinia in a scintillator material containing 3 mole percent Eu$_2$O$_3$.

The relative mole percentages of Gd$_2$O$_3$ and Y$_2$O$_3$ are shown on the horizontal axis, while the relative light output is shown on the vertical axis. The dashed line at 50 mole percent Gd$_2$O$_3$ and 50 mole percent Y$_2$O$_3$ indicates the beginning of a gradual crystalline phase transition in the scintillator material structure from the cubic phase to the monoclinic phase. It will be observed that high relative light output is obtained from scintillator materials containing up to about 50 mole percent Gd$_2$O$_3$. Scintillator materials containing between 50 and 65 mole percent Gd$_2$O$_3$ exhibit modest relative light output, but are increasingly subject to grain boundary cracking and reduced relative light output due to progressive transition from cubic to monoclinic crystalline phase.

The cubic crystalline phase is characterized by a high degree of scintillator material structural symmetry. Materials having such structure are particularly desirable for CT applications. Scintillator materials having increasing amounts of monoclinic phase are characterized by lower relative light outputs and poor optical clarity due to grain boundary cracking and nonuniform crystalline structure. Materials having such noncubic structure exhibit appreciable light scattering and reabsorption due to a longer effective relative light path length, thereby decreasing the amount of light available for detection by external photosensors.

Figure 3B:
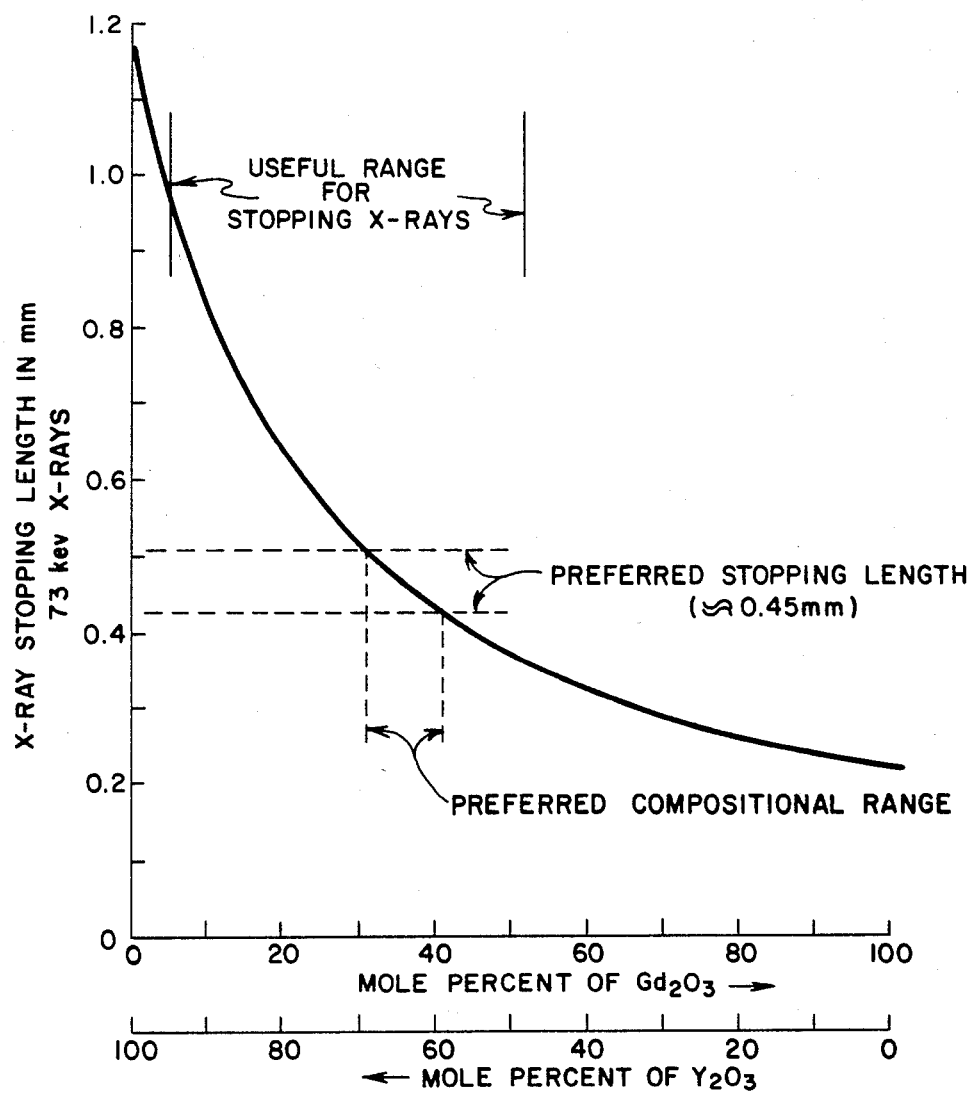
FIG. 3b is a graph illustrating 73 kev X-ray stopping power versus yttria-gadolinia compositional ratio of an inventive ceramic scintillator.

In considering the usefulness of the scintillator material in CT applications, the X-ray stopping power of the material must also be considered. FIG. 3b illustrates the dependence of 73 kev X-ray stopping length on yttria-gadolinia compositional ratio for transparent and efficient scintillators. Stopping power is measured in terms of X-ray stopping length, i.e., the distance an X-ray photon penetrates into the scintillator prior to its conversion to optical wavelength photons which are detectable by photosensors. X-ray stopping length is primarily dependent on Gd$_2$O$_3$ content and, as shown in FIG. 3b, increases with increased Gd$_2$O$_3$ concentration. Generally, it is preferred to use between about 5 mole percent and 50 mole percent Gd$_2$O$_3$. Materials containing less than about 5 mole percent Gd$_2$O$_3$ exhibit low X-ray stopping power for most practical detector design, while materials having more than 50 mole percent are increasingly non-cubic and exhibit poor optical clarity. A more preferred range of Gd$_2$O$_3$ content is between 20 and 40 mole percent. The most preferred range of Gd$_2$O$_3$ concentration is between 30 mole percent and 40 mole percent, corresponding to an X-ray stopping length of about 0.45 mm. For a 2 millimeter thick scintillator material having an X-ray stopping length of 0.45 mm, approximately 99 percent of X-ray photons entering the material are converted to optical wavelength photons.

Certain additives are useful in the yttria-gadolinia scintillator system of the present invention to reduce undesirable scintillator material luminescent afterglow, which may lead to undesirable distortion and the presence of artifacts in reconstructed images. The luminescent afterglow phenomenon is classifiable into primary or fundamental afterglow and secondary afterglow. Primary afterglow is of relatively short duration (up to approximately 3 milliseconds), while secondary afterglow may be several times to much more than several times the primary decay time. Fundamental luminescent afterglow of a phosphor is thought to be inextricably associated with the specific activator identity and the activator local environment in the host matrix (in this case yttria-gadolinia). The secondary, and most objectionable type of afterglow, can be associated with more subtle changes in the activator environment or simply with the presence of additional electron-hole "trapping" centers created by native defects and/or low level impurities at other sites in the host crystal. Both types of afterglow may be reduced by suitable purification or the addition of compensating dopants. The added dopants used to reduce afterglow do so by forming "killer" centers which are believed to compete with the activator centers for electron-hole pairs that otherwise combine radiatively at the activator centers.

Luminescent afterglow of rare earth doped yttria-gadolinia ceramic scintillators of the present invention can be substantially reduced by several types of additives.

Figure 4:
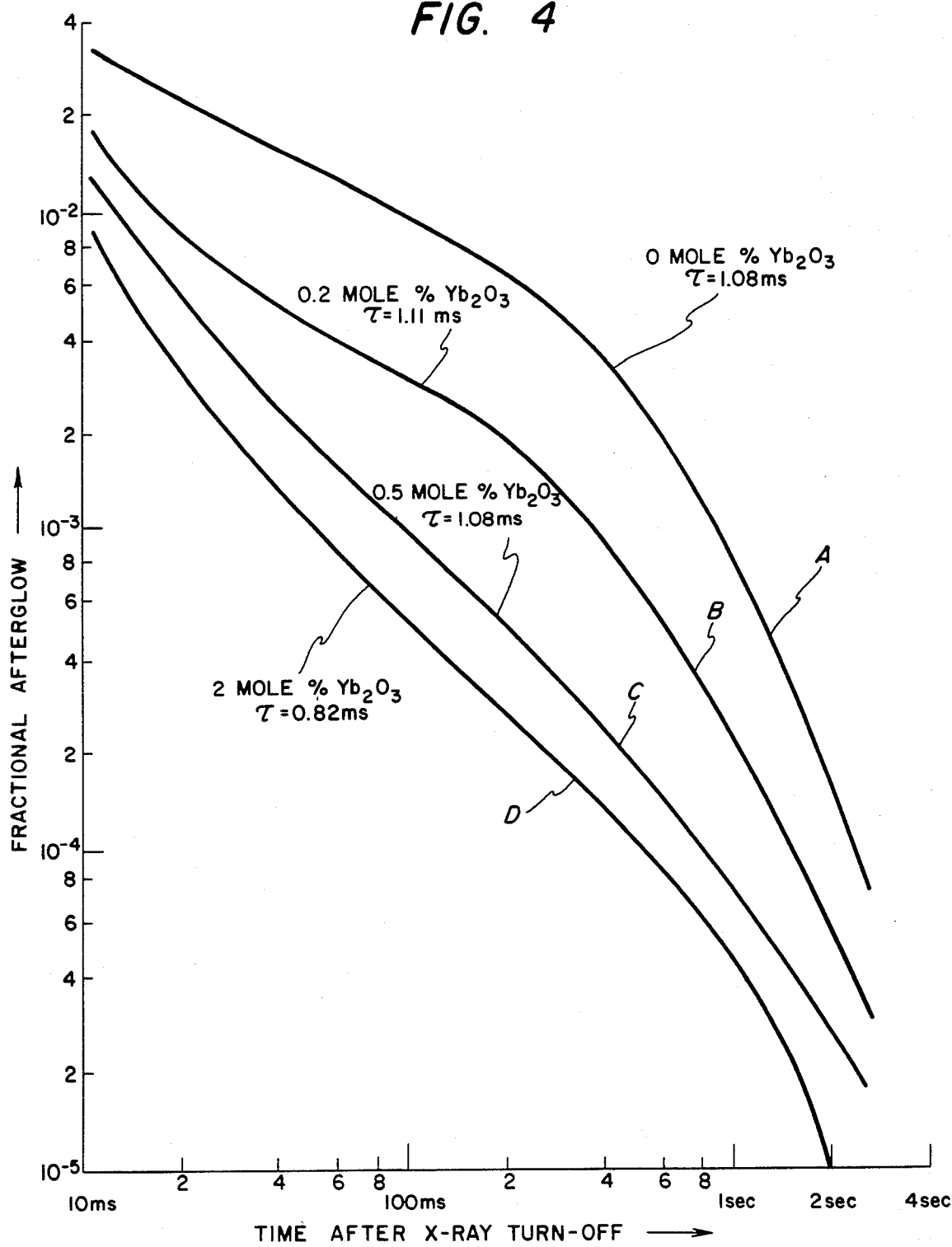
FIG. 4 is a graphical illustration of the effect of increased $Yb_2O_3$ concentrations on scintillator material afterglow.
Figure 5:
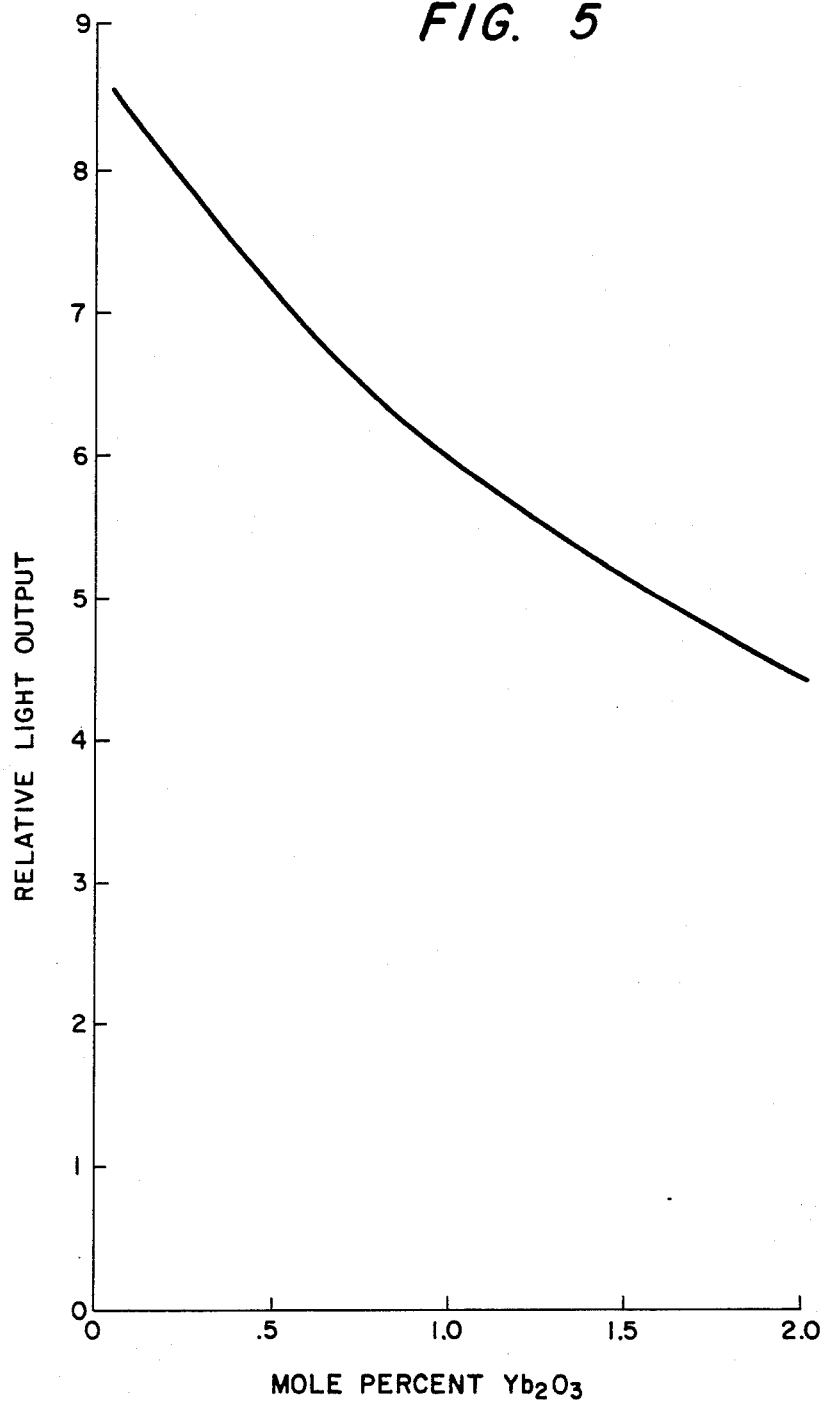
FIG. 5 depicts graphically the relative light output of an inventive scintillator material with increased $Yb_2O_3$ content.

The addition of ytterbium oxide ($Yb_2O_3$), itself a luminescent activator in the yttria-gadolinia host if used alone as described heretofore, results in the reduction of undesirable secondary afterglow with only minor sacrifice of luminescent efficiency. If, as depicted in FIG. 4, the mole percentage of $Yb_2O_3$ is increased from zero to about 2 mole percent, the primary or fundamental afterglow, $\tau$, of the scintillator material activated with 3 mole percent of $Eu_2O_3$ is reduced from 1.1 to 0.82 milliseconds. An increase in $Yb_2O_3$ content from 0 to 2 mole percent is accompanied by the loss of nearly 50 percent of scintillator material luminescent efficiency as graphically depicted in FIG. 5, in which relative light output is shown on the vertical axis, while the $Yb_2O_3$ concentration is shown on the horizontal axis.

Curves A, B, C, and D, depicted in FIG. 4, illustrate the fraction of secondary luminescent afterglow (vertical axis) remaining at times greater than 10 milliseconds (horizontal axis) following the cessation of X-ray excition. For a scintillator material having 30 mole percent $Gd_2O_3$, 3 mole percent $Eu_2O_3$, and 67 mole percent $Y_2O_3$, but no $Yb_2O_3$, is evident from Curve A that about three percent of the luminescence present immediately upon X-ray shut-off remains at the end of 10 milliseconds following X-ray turn-off. Curves B, C, and D depict fractional afterglow for similar scintillator materials which additionally contain 0.2, 0.5, and 2 mole percent $Yb_2O_3$, respectively, and correspondingly less $Y_2O_3$. It is apparent that increasing quantities of $Yb_2O_3$ reduce secondary afterglow. For example, at about 10 milliseconds after X-ray turn-off, fractional afterglow for a scintillator material containing 2 mole percent $Yb_2O_3$ (Curve D) is only approximately 0.7 percent ($7 \times 10^{-3}$) of its value immediately upon termination of X-ray excitation as compared to about 3 percent ($3 \times 10^{-2}$) for a material without $Yb_2O_3$ (Curve A). The addition of 0.3 mole percent $Yb_2O_3$ to a scintillator composition made up of 66.7 mole percent $Y_2O_3$, 30 mole percent $Gd_2O_3$, and 3 mole percent $Eu_2O_3$ results in an extremely useful CT scintillator material having a fast decay time. Preferred concentration of $Yb_2O_3$ for afterglow reduction is between about 0.15 and 0.7 mole percent.

Another additive dopant which is effective in reducing scintillator material luminescent afterglow is strontium oxide (SrO). The addition of SrO results primarily in the reduction of secondary afterglow with relatively little sacrifice of luminescent efficiency. In the yttria-gadolinia scintillator system, the quantity of SrO generally found to be useful in reducing afterglow is between 0.1 and 2 mole percent. It is shown in FIG. 6 that an increase in the quantity of SrO from 0 to 2 mole percent has no appreciable effect on primary afterglow, $\tau$, 1.08 milliseconds and 1.10 milliseconds, respectively. However, there is appreciable effect on secondary afterglow as depicted by curves E and F. A scintillator material having 30 mole percent $Gd_2O_3$, 2 mole percent $Eu_2O_3$, 68 mole percent $Y_2O_3$, but no SrO (curve E) exhibits, at about 150 milliseconds after X-ray turn-off, about 0.8 percent ($8 \times 10^{-2}$) of the luminescence present immediately after X-ray shut-off. Scintillator materials having the same composition (curve F) but including 2 mole percent SrO (and 2 mole percent less $Y_2O_3$) exhibit, after the same elapsed time, only about 0.03 percent ($3 \times 10^{-4}$) fractional afterglow as indicated on the vertical axis in FIG. 6.

The addition of calcium oxide (CaO) to the scintillator material (instead of SrO) has been found to produce an afterglow reducing effect similar to that obtained with SrO. CaO is useful as an afterglow reducer in quantities of between 0.1 and 2 mole percent.

The aforedescribed yttria-gadolinia rare-earth-doped ceramic scintillator materials may be prepared by sintering, sintering plus gas hot isostatic pressing, and hot pressing ceramic methods. The ceramic scintillator materials are preferably and most economically fabricated by employing a sintering process.

A preliminary step in the fabrication of the ceramic scintillators, by any of the aforementioned methods, requires the preparation of a suitable powder containing the desired scintillator material constituents. In accordance with a first method for preparing such a powder, submicron-to-micron powders of yttria ($Y_2O_3$) and gadolinia ($Gd_2O_3$) having purities of, for example, 99.99 percent to 99.9999 percent are mixed with the desired rare earth activators in the form of oxides, oxalates, carbonates, or nitrates and mixtures thereof. The mixing of the selected constituents may be carried out in an agate mortar and pestle or in a ball mill using water, heptane, or an alcohol (such as ethyl alcohol) as liquid vehicles. Dry milling may also be used for both mixing and breakup of powder aggregates. If dry milling is employed, a grinding aid such as 1 to 5 weight percent of stearic acid or oleic acid should be employed to prevent powder packing or sticking inside the ball mill. A transparency promoter SrO may also be added in the form of an oxide, nitrate, carbonate, or oxalate before ball milling. If the various additivies are nitrates, carbonates, or oxalates, a calcining step is required to obtain the corresponding oxides prior to fabrication of the ceramic scintillator by any of the methods described hereinafter.

A second approach to obtaining the desired scintillator starting powder employs a wet chemical oxalate method. In this method, the selected molar percentages of the nitrates of predetermined ones of Y, Gd, Eu, Nb, Yb, Dy, Tb, Pr, and Sr are dissolved in water and co-precipitated in oxalic acid to form the respective oxalates. The oxalate precipitation process involves the addition of an aqueous nitrate solution of the desired scintillator material constituents to an oxalic acid solution which is, for example, 80 percent saturated at room temperature. The resulting coprecipitated oxalates are washed, neutralized, filtered, and dried in air at about 100° C. for approximately eight hours. The oxalates are then calcined in air (thermally decomposed) at approximately 700° C. to about 900° C. for a time ranging from one to four hours, to form the corresponding oxides. Typically, heating for one hour at 800° C. is sufficient. Preferably, if either the hot pressing or the sintering method is used to prepare the scintillator, the oxalates and/or the resulting oxides are milled by one of several methods such as ball, colloid, or fluid energy milling to enhance the optical clarity. Milling of the powder for between one-half hour and ten hours has been found to be sufficient. It should be noted, however, that typically the optical clarity of the scintillator is improved by milling the oxalates and/or oxides regardless of the preparation method.

Following the preparation of the selected powder composition by one of the methods described above, in accord with the preparation of scintillator materials by sintering, selected amounts of the powder composition are formed into powder compacts by either die pressing, or die pressing followed by isostatic pressing to further increase green density. A die material which is inert with respect to the scintillator constituents is preferred to avoid undesired reactions and contaminations. Suitable die materials include alumina, silicon carbide, and metals such as molybdenum, hardened steel, or nickel-based alloys. The powder compacts are formed by die pressing at pressures of between about 3,000 psi and 15,000 psi. Alternatively, the die pressed powder compacts may be isostatically pressed at between about 10,000 and 60,000 psi to further increase powder compact green density. If any grinding aids or compaction aids (lubricants, such as waxes) have been used, an oxidation treatment to remove all organic additives can be employed prior to sintering.

During the sintering phase, the compacts are heated in a high temperature tungsten furnace, for example, in vacuum or a reducing atmosphere such as a wet hydrogen atmosphere (dew point of about 23° C., for example) at a rate of between approximately 100° C. per hour and 700° C. per hour to the sintering temperature of between 1800° C. and 2100° C. The sintering temperature is then held from 1 hour to about 30 hours to cause extensive densification and optical clarity development. Upon termination of the sintering step, the compacts are cooled from the sintering temperature to room temperature over a period of time ranging from about 2 to 10 hours.

Sintered ceramic scintillators may also be prepared by a heating sequence which includes a hold at a temperature lower than the final sintering temperature. Typically, the powder compact is heated at a rate of between 300° C./hr and 400° C./hr to a holding temperature of between about 1600° C. and 1700° C. The holding period may range from 1 hour to 20 hours, following which the temperature is raised to between about 1800° C. and 2100° C. for final sintering for between 1 hour and 10 hours. The increase from the holding temperature to the final sintering temperature is at a rate of between about 25° C./hr and 75° C./hr. A preferred heating sequence comprises heating the powder compact to a holding temperature of 1660° C. in five hours, holding this temperature for 10 hours, followed by heating to 1950° C. in 6 hours, and then sintering at 1950° C. for 2 hours.

A first ceramic scintillator composed of 59.85 mole percent $Y_2O_3$, 40 mole percent $Gd_2O_3$, and 0.15 mole percent $Tb_2O_3$, and a second scintillator made up of 59.8 mole percent $Y_2O_3$, 40 mole percent $Gd_2O_3$, and 0.2 mole percent $Dy_2O_3$ were prepared using the preferred sintering sequence. In each case, oxalates of the selected constituents were prepared by the oxalate coprecipitation method and calcined at 800° C. for one hour to obtain the corresponding oxides. The oxides were initially cold pressed into powder compacts at 3500 psi and then isostatically pressed at 29,000 psi to further increase green density. This was followed by heating the powder compacts in a wet $H_2$ atmosphere in five hours to 1660° C. Following a 10 hour holding period at 1660° C. the temperature was raised to 1950° C. and held for two hours. The resulting ceramic scintillators were then furnace-cooled to room temperature.

Yttria/gadolinia ceramic scintillators for luminescent applications may also be prepared by a combination of processes involving sintering and gas hot isostatic pressing (GHIP). The starting oxide powder compositions are prepared in accordance with one of the aforedescribed methods. Preferably, the oxalate coprecipitation method is used. By way of example and not limitation, one useful yttria-gadolinia scintillator composition comprised 66.7 mole percent $Y_2O_3$, 30 mole percent $Gd_2O_3$, 3 mole percent $Eu_2O_3$, and 0.3 mole percent $Yb_2O_3$. Another useful composition comprised 49.7 mole percent $Y_2O_3$, 45 mole percent $Gd_2O_3$, 5 mole percent $Eu_2O_3$, and 0.3 mole percent $Yb_2O_3$. In contrast to the previously described sintering process, which preferably requires milling of the oxalate and/or oxide powders to produce transparent ceramics, the process of sintering combined with GHIP permits the fabrication of transparent ceramics from unmilled powders.

In the fabrication of yttria-gadolinia ceramic scintillators by the combined processes of sintering and gas hot isostatic pressing, following the preparation of a powder having the desired composition, powder compacts are formed by cold pressing at pressures of between about 3,000 psi and 10,000 psi, followed by isostatic pressing at pressures of between about 15,000 psi and 60,000 psi. The pressed compacts are then presintered in vacuum or a reducing atmosphere, such as, for example, a wet hydrogen atmosphere (dew point of about 23° C., for example), to about 93 to 98 percent of their theoretical density at temperatures of between about 1500° C. and 1700° C. for between about 1 and 10 hours. The presintered compacts are then gas hot isostatically pressed with an inert gas, such as, for example, argon gas, at pressures of between about 1,000 psi and 30,000 psi at temperatures between about 1500° C. and 1800° C. for between about one-half and 2 hours.

In accordance with one example of the preparation of a ceramic scintillator employing the sintering and GHIP technique, a powder compact was formed by cold pressing approximately 20 grams of powder in a rectangular die at a pressure of approximately 4,000 psi. The sample was then isostatically pressed at 30,000 psi to increase green density to 49 percent of its theoretical value. The cold pressing of the sample was followed by sintering in a wet hydrogen atmosphere (dew point 23° C.) for two hours at 1660° C. so that closed porosity was developed. The density of the sintered sample, as measured by the water immersion method, at this stage in the fabrication process was determined to be between 93 and 97 percent of its theoretical value. In order to obtain additional densification and optical transparency, the sample was placed in packing powder having the same composition as the sample and gas hot isostatically pressed in a molybdenum-element resistance furnace at 1750° C. for one-half hour with argon gas at a pressure of 15,000 psi. The resulting ceramic scintillator was transparent in optical quality, with a light pinkish color. When the unpolished sample was set on a line of fine print, the print could easily be read through the sample. Comparison of the physical dimensions and weight of the sample before and after the GHIP treatment indicates that the sample shrunk during the GHIP step, indicating further densification. The finished ceramic exhibited a density of greater than 99.9 percent of theoretical value.

In accordance with another example of the preparation of a ceramic scintillator employing the sintering and GHIP technique, a powder compact was formed by cold pressing approximately 20 grams of powder in a rectangular die at a pressure of approximately 4,000 psi. The sample was then isostatically pressed at 30,000 psi to increase green density to 49 percent of its theoretical value. The cold pressing of the sample was followed by sintering in a wet hydrogen atmosphere (dew point 23° C.) for two hours at 1660° C. so that closed porosity was developed. The density of the sintered sample, as measured by the water immersion method, at this stage in the fabrication process was determined to be between 93 and 98 percent of its theoretical value. In order to obtain additional densification and optical transparency, the sample was gas hot isostatically pressed in a carbon-element resistance furnace at 1750° C. for one hour with argon gas at a pressure of 25,000 psi. During the above sintering and gas hot isostatic pressing process, the temperature was increased to the final value of 1750° C. in a step-wise manner. The sample was initially heated in one hour to 1400° C. and the temperature raised thence to 1750° C. in another hour. Following a holding period of one hour at 1750° C., the resulting ceramic scintillator had a black appearance due to reduction in the reducing furnace atmosphere. The sample was rendered transparent to visible light by suitable oxidation treatment, such as heating in air at a temperature of 1200° C. for thirty-two hours. Comparison of the physical dimensions of the sample before and after the above GHIP treatment indicates that the sample shrunk during the GHIP step, indicating further densification. The finished ceramic exhibited a density of greater than 99.9 percent of theoretical value.

Transparent yttria-gadolinia ceramic scintillators may also be prepared by vacuum hot pressing a scintillator material powder prepared, preferably, by the aforedescribed wet oxalate coprecipitation process. In accordance with this method, a selected quantity of the calcined oxalate powder (preferably milled) is pressed in a graphite die with molybdenum foil used as spacers between the upper and lower graphite plungers. Alternatively, a boron nitride coated graphite die may be used. A pressure of about 1000 psi to 1200 psi is applied at a temperature of between about 600° C. and 700° C. under a vacuum of less than 200 microns and maintained for about one hour. Thereafter, the pressure is increased to approximately between 4000 psi and 10,000 psi and the temperature increased to between 1300° C. and 1600° C. The pressure is released after a hold at the elevated temperature for between one-half and four hours and the sample furnace cooled to room temperature.

Ceramic scintillator samples prepared in accordance with the hot-pressing method may be discolored due to surface reaction with the molybdenum spacer. Additional discoloration may be due to oxygen deficiency in the furnace atmosphere during hot pressing. The ceramics, however, can be made optically clear by oxidation in air or an oxygen-containing atmosphere at a temperature of about 800° C. to 1200° C. for between one and twenty hours. Any residual discoloration may be removed by conventional grinding and polishing techniques.

In a specific example of the preparation of a scintillator material by the vacuum hot-pressing method, 10 grams of a scintillator oxide material were obtained from the aforedescribed oxalate coprecipitation process by calcination of the oxalates at 800° C. for one hour in air. The oxides were initially hot pressed in a boron nitride coated graphite die at 700° C. for one hour under a vacuum of about 20 microns and at a pressure of 1200 psi. The temperature and pressure were then increased to 1400° C. and 6,000 psi, respectively, under a vacuum of approximately 100 microns. These conditions were maintained for two hours, following which the pressure was released and the resulting scintillator material furnace cooled.

The scintillator material was gray to gray-black in color due to the reducing atmosphere created in the hot press. Light grinding of the scintillator surface and heating at 950° for four hours removed carbon sticking to the scintillator material. The remainder of the dark coloration was removed by additional oxidation at 1150° C. for two hours in air. The resulting scintillator material was "light tan" in color, translucent to transparent in optical quality, and exhibited good relative light output upon excitation by X-rays.

From the foregoing, it will be appreciated that the invention provides a method for sintering and gas hot isostatic pressing transparent-to-translucent, rare-earth-doped polycrystalline yttria-gadolinia ceramic scintillators having cubic crystalline structure, high X-ray stopping power, high radiant efficiency, high density, and high uniformity, as well as low luminescence afterglow, and which are useful as radiation detectors such as those used in CT and digital radiography.

While certain preferred features of the invention have been shown by way of illustration, many modifications and changes will occur to those skilled in the art. It is, therefore, to be understood that the appended claims are intended to cover all such modifications and changes as fall within the true spirit of the invention.

The invention claimed is:

1. A method for preparing a transparent-to-translucent polycrystalline ceramic X-ray or gamma-ray scintillator body comprising the steps of:

preparing a multicomponent powder consisting essentially of $Y_2O_3$, $Gd_2O_3$, and at least one rare earth activator oxide selected from the group consisting of $Eu_2O_3$, $Nd_2O_3$, $Yb_2O_3$, $Dy_2O_3$, $Tb_2O_3$, and $Pr_2O_3$;

pressing said multicomponent powder to form a powder compact;

sintering said powder compact to the closed porosity stage; and gas hot isostatically pressing the sintered compact with an inert gas to yield a transparent-to-translucent polycrystalline ceramic scintillator body.

2. The method of claim 1 wherein said multicomponent powder comprises between about 5 and 50 mole percent $Gd_2O_3$ and between about 0.02 and 12 mole percent of at least one of said rare earth activator oxides, the remainder being $Y_2O_3$.

3. The method of claim 2 wherein said multicomponent powder comprises between about 20 and 40 mole percent $Gd_2O_3$.

4. The method of claim 1 wherein said multicomponent powder comprises between about 20 and 40 mole percent $Gd_2O_3$, between about 1 and 6 mole percent $Eu_2O_3$, and between about 0.1 and 2 mole percent $Yb_2O_3$, the remainder being $Y_2O_3$.

5. The method of claim 1 wherein said multicomponent powder comprises between about 1 and 6 mole percent $Eu_2O_3$.

6. The method of claim 1 wherein said multicomponent powder comprises between about 0.05 and 1.5 mole percent $Nd_2O_3$.

7. The method of claim 1 wherein said multicomponent powder comprises between about 0.05 and 3 mole percent $Tb_2O_3$.

8. The method of claim 1 wherein said multicomponent powder comprises between about 0.1 and 2 mole percent $Yb_2O_3$.

9. The method of claim 1 wherein said multicomponent powder comprises between about 0.03 and 1 mole percent $Dy_2O_3$.

10. The method of claim 1 wherein said multicomponent powder comprises between about 0.02 and 0.05 mole percent $Pr_2O_3$.

11. The method of claim 1 wherein said multicomponent powder further comprises between about 0.1 and 2 mole percent SrO.

12. The method of claim 1 wherein said multicomponent powder further comprises between about 0.1 and 2 mole percent CaO.

13. The method of claim 1 wherein said step of preparing said multicomponent powder comprises mixing high purity, micron-to-submicron powders of $Gd_2O_3$, $Y_2O_3$, and at least one of said rare earth activator oxides.

14. The method of claim 1 wherein said step of preparing said multicomponent powder comprises:
coprecipitating by the wet chemical oxalate process the oxalates of Y, Gd, and at least one of said rare earth activators; and
calcining said oxalates so as to obtain the corresponding oxides.

15. The method of claim 14 wherein said step of calcining comprises heating said oxalates in air at a temperature of between about 700° C. and 900° C. for between about 1 hour and 4 hours.

16. The method of claim 14 wherein said step of calcining is preceded by the step of milling said oxalates.

17. The method of claim 14 further comprising the step of milling said oxides obtained in said calcining step.

18. The method of claim 1 wherein said step of pressing to form said powder compact comprises:
cold pressing said multicomponent powder at a pressure of between about 3,000 psi and 10,000 psi to form a preliminary powder compact; and then
isostatically pressing said preliminary powder compact at a pressure of between about 15,000 psi and 60,000 psi to increase the green density thereof.

19. The method of claim 18 wherein said step of sintering comprises heating said powder compact at a temperature of between about 1500° C. and 1700° C. for between about 1 and 10 hours.

20. The method of claim 19 wherein said step of gas hot isostatically pressing the sintered compact comprises heating at a temperature of between about 1500° C. and 1800° C. for between about one-half and 2 hours at an argon gas pressure of between about 1,000 psi and 30,000 psi.

21. The method of claim 20 wherein said step of gas hot isostatically pressing the sintered compact comprises heating at a temperature of 1750° C. for one-half hour at an argon gas pressure of 15,000 psi.

22. The method of claim 20 wherein said step of gas hot isostatically pressing the sintered compact comprises:
heating said compact for one hour to raise the temperature thereof to 1400° C., continue heating said compact for an additional one hour to raise the temperature thereof to 1750° C.; and then
maintaining the temperature of said compact at 1750° C. for 1 hour prior to furnace-cooling said compact to room temperature, said steps of heating and maintaining the temperature being performed at an argon gas pressure of 25,000 psi.

* * * * *